United States Patent
Schiek et al.

(10) Patent No.: US 7,545,288 B2
(45) Date of Patent: Jun. 9, 2009

(54) SUPPORT SYSTEM FOR THE MONITORING OF AN AIR OUTLET VALVE IN AN AIRCRAFT

(75) Inventors: Thorsten Schiek, Hamburg (DE); Thomas Heuer, Hamburg (DE); LeiLei Chen, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 95 days.

(21) Appl. No.: 10/585,003

(22) PCT Filed: Dec. 30, 2004

(86) PCT No.: PCT/EP2004/014863
§ 371 (c)(1),
(2), (4) Date: Apr. 27, 2007

(87) PCT Pub. No.: WO2005/063571
PCT Pub. Date: Jul. 14, 2005

(65) Prior Publication Data
US 2007/0247335 A1    Oct. 25, 2007

(30) Foreign Application Priority Data
Dec. 30, 2003    (DE)    ............... 103 61 708

(51) Int. Cl.
G08B 21/00    (2006.01)
H04N 7/18    (2006.01)

(52) U.S. Cl. .................... 340/945; 340/678; 348/61; 348/82; 348/143

(58) Field of Classification Search ............. 340/945; 348/68, 82, 83
See application file for complete search history.

(56) References Cited

U.S. PATENT DOCUMENTS

| | | | |
|---|---|---|---|
| 2,950,340 A * | 8/1960 | Compton et al. ............ | 348/117 |
| 4,553,474 A | 11/1985 | Wong et al. | |
| 5,056,046 A * | 10/1991 | Mutchler et al. ............. | 702/98 |
| 5,349,435 A | 9/1994 | Hall et al. | |
| 5,520,578 A | 5/1996 | Bloch et al. | |
| 5,844,601 A * | 12/1998 | McPheely et al. ........... | 348/143 |
| 6,335,722 B1 * | 1/2002 | Tani et al. ................... | 345/173 |
| 2003/0071899 A1 | 4/2003 | Joao | |

FOREIGN PATENT DOCUMENTS

EP    0628807 A1    12/1994

(Continued)

OTHER PUBLICATIONS

Forms PCT/ISA/210, 220, 237 International Search Report for PCT/EP2004/O14863, mailed on Apr. 13, 2005.

*Primary Examiner*—Donnie L Crosland
(74) *Attorney, Agent, or Firm*—Wood, Herron & Evans, L.L.P.

(57) ABSTRACT

The invention proposes that a camera (18) takes a technical picture of an air outlet valve (10) of an aircraft, and the picture taken of the outlet valve (10) is displayed on a picture display unit (20), for example in the cockpit of the aircraft. By shining light onto the outlet valve from a light source (22), a clear picture with a high level of contrast is produced. The valve setting of the outlet valve (10) can thus be monitored visually, in a reliable manner, by the pilot.

12 Claims, 1 Drawing Sheet

FOREIGN PATENT DOCUMENTS

| | | |
|---|---|---|
| FR | 2686568 | 7/1993 |
| JP | 10282063 A | 10/1998 |
| JP | 11306489 A | 11/1999 |
| JP | 2000205837 A | 7/2000 |
| JP | 2002240798 | 8/2002 |
| WO | WO 01/03437 A1 | 1/2001 |
| WO | WO 03/039957 A1 | 5/2003 |

\* cited by examiner

SUPPORT SYSTEM FOR THE MONITORING OF AN AIR OUTLET VALVE IN AN AIRCRAFT

This application is a 371 of PCT/EPO4/14863, filed Dec. 30, 2004

BACKGROUND

The invention relates to a support system for the monitoring of an air outlet valve in an aircraft.

The outlet valve being considered here is a valve which serves to control the cabin pressure of a transport aircraft for passengers or goods. Air from the cabin flows through the outlet valve into the external surrounds. The cabin pressure depends upon the valve setting of the outlet valve.

After landing the aircraft doors can only be opened if the outlet valve (just one outlet valve is referred to here; it is, however, clear that aircraft can also be equipped with two or more outlet valves) has been fully opened previously so that total equalization of the cabin pressure and the atmospheric level on the ground can take place. For this, the outlet valve must not be covered or blocked. Incomplete opening of the outlet valve or an impaired flow of air through the valve can result in residual low pressure in the cabin, which can be dangerous. There have been numerous injuries in the past as a result of residual high pressure when the cabin doors were opened which can cause the doors to swing open towards the outside in an uncontrolled manner.

Generally, the valve setting of the outlet valve is determined by sensors and established in the cockpit of the aircraft. Despite monitoring by sensors, accidents have still happened because the sensors used are unreliable and indicated a fully open valve setting, even though this was not the case, or the valve was fully open, but covered by objects.

The aim of the invention, therefore, is to improve safety when opening aircraft doors.

SUMMARY

As a solution to this problem, the invention proposes a support system for the monitoring of an air outlet valve in an aircraft, whereby this system includes a camera directed at the outlet valve and a picture display unit to show pictures of the outlet valve taken by the camera.

DETAILED DESCRIPTION

Figure 1:
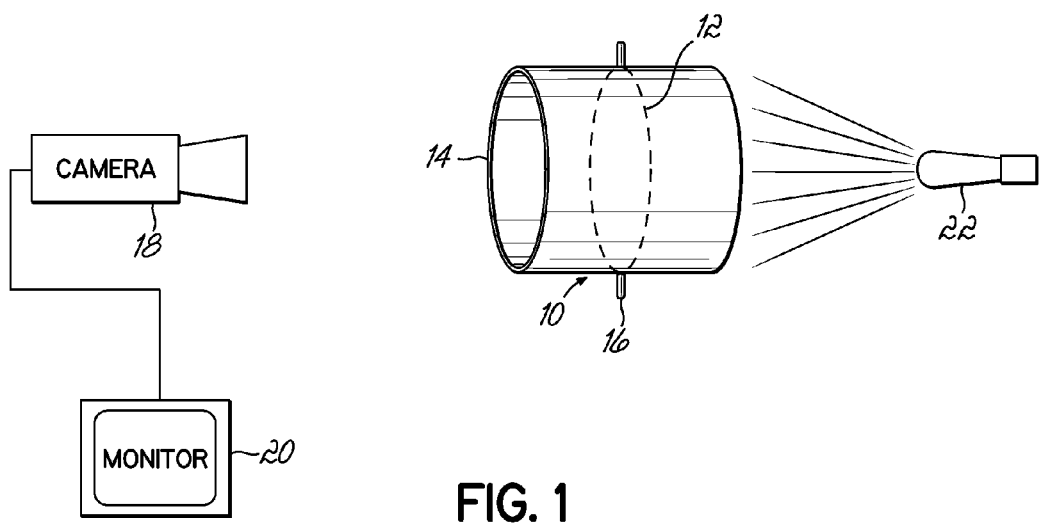
FIG. 1 is a schematic representation of the support system and outlet valve of the invention.

By means of the technical picture representation of the outlet valve, an observer can clearly identify clearly, and without doubt, the valve setting of the outlet valve shown by the picture display unit, and so be reliably certain that the outlet valve is actually in its fully open setting. The invention therefore follows on from the previous task of identifying the valve setting of the outlet valve with appropriate sensors and communicating the results identified to the pilot, the accuracy of which he has to depend upon. Instead of this, the invention offers the pilot (or another person who is responsible for checking the valve setting of the outlet valve) the possibility to check the valve with his own eyes—an unusual way in a world which tries more and more to relieve people of tasks by the use of technical devices. It has, however, been shown that this way provides greater safety, and accidents associated with opening the doors of aircraft can be better avoided.

The picture display unit is specifically positioned within the cockpit of the aircraft. It is not, however, fundamentally out of the question to position the picture display unit elsewhere in the aircraft, for example so that the personnel responsible for opening the aircraft doors have the possibility of checking the valve setting of the outlet valve.

In a preferred form, the outlet valve is provided with a valve lighting system, whereby the light is directed onto the outlet valve. By illuminating the outlet valve, an even higher level of safety is offered because the valve setting is more easily identified on the picture displayed. It can be advantageous to arrange the valve lighting system in such a way that, seen from the camera, rear lighting is created for the outlet valve. Such rear lighting can be helpful for more clearly identifying the edge contours of the valve elements of the outlet valve on the picture displayed, and so to be able to make a better assessment of the valve setting. In order to provide rear lighting, the camera and the valve lighting system can be directed, approximately at least, from the opposite side onto the outlet valve.

The valve lighting system can have any number of lighting elements, for example just one, or several lighting elements distributed in an appropriate arrangement. With regard to the spectral composition of the light emanating from the valve lighting system, various solutions are possible here as well. The valve lighting system can be designed in such a way that the outlet valve is illuminated with infra-red light. Alternatively, black light can be used to illuminate the outlet valve. It is, of course, also possible to use visible light for the illumination of the outlet valve.

Identification of the outlet valve on the picture displayed can be improved further by providing at least parts of the outlet valve with reflective coating for at least one part of the light spectrum of the valve lighting system. It is also possible to provide at least parts of the outlet valve with a coating which absorbs part of the light spectrum of the valve lighting system. The spectral sensitivity of the camera is specifically suited to the spectrum of the light emitted and appropriate to the absorptive and/or reflective properties of the outlet valve. For example, the camera can be a mono-chrome camera.

Independent of the provision of the camera and the picture display unit, heightened safety when opening aircraft doors can also be offered by the valve lighting system alone. The outlet valve can, indeed, also be checked by direct observation without transferring a picture of the outlet valve to a place some distance away. Here, the valve lighting system improves identification of the outlet valve which is often installed in a relatively dark position at the stern of the aircraft.

An example of the invention is illustrated on the attached drawing in FIG. 1. This gives a schematic representation of an outlet valve 10 of an aircraft which is not illustrated. The outlet valve 10 is in the form of a flap valve with a so-called butterfly valve flap 12, which is built into an air outlet channel 14 so as to rotate around an axis 16. A camera 18 is directed onto the outlet valve 10 from one side, and this takes a picture of the outlet valve 10. The camera 18 sends its picture to a monitor 20, on which the picture of the outlet valve 10 is displayed. The monitor 20 is positioned, for example, in the cockpit of the aircraft. From the opposite side, light, which can be infra-red light, black light, or another light, is shone onto the outlet valve 10 by a lighting source 22. By means of this background lighting, a particularly contrast-rich picture can be obtained which allows the contours of the valve flap 12 to be clearly identified.

Figure 2:
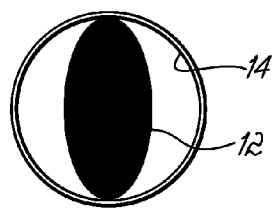
FIG. 2 is a front view of the outlet valve of FIG. 1 in a partially closed position.
Figure 3:
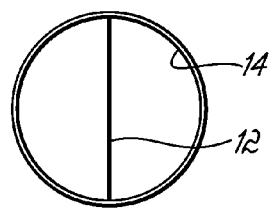
FIG. 3 is a front view of the outlet valve of FIG. 1 in an fully open position.

In FIG. 2 the valve flap 12 is shown in a partially closed setting. If the camera takes a picture of the outlet valve 10 more or less from directly in front, the valve flap 12 in a partially closed setting appears as an ellipse on the picture displayed. The wider the ellipse, the more firmly shut the outlet valve 10. From this, the pilot can safely and reliably assess the valve setting of the outlet valve 10. Only when the valve flap 12 appears on the picture displayed more or less just as a line, as shown in FIG. 3, the pilot knows that the outlet valve 10 is fully open.

What is claimed is:

1. A support system for monitoring an air outlet valve in an aircraft, the system comprising:
    an air outlet valve disposed between an aircraft cabin and the outside atmosphere, wherein the air outlet valve can be fully opened to equalize the air pressure within the aircraft cabin with the outside atmosphere before aircraft cabin doors are opened;
    a camera arranged to capture an image viewed through the air outlet valve; and
    a display unit in operable communication with the camera and adapted to display the image taken by the camera;
    wherein an observer of the display unit can visually determine whether the air outlet valve is fully opened, partially opened, fully closed, or otherwise obstructed before aircraft cabin doors are opened.

2. The support system of claim 1, wherein the display unit is positioned within a cockpit of the aircraft.

3. The support system of claim 1, further comprising:
    a valve lighting system designed to direct light onto the air outlet valve.

4. The support system of claim 3, wherein the camera is disposed on a first side of the air outlet valve and the valve lighting system is disposed on a second side of the air outlet valve.

5. The support system of claim 3, wherein the valve lighting system directs infrared light onto the air outlet valve.

6. The support system of claim 3, wherein the valve lighting system directs black light onto the air outlet valve.

7. The support system of claim 3, wherein the air outlet valve further comprises a coating which reflects at least part of the light from the valve lighting system.

8. The support system of claim 3, wherein the air outlet valve further comprises a coating which absorbs at least part of the light from the valve lighting system.

9. The support system of claim 1, wherein the camera further comprises a monochrome camera.

10. The support system of claim 1, wherein the support system is adapted to allow continuous monitoring of the air outlet valve during operation of the air outlet valve.

11. The support system of claim 1, wherein the air outlet valve further comprises a valve channel and a butterfly valve flap disposed within the valve channel, the butterfly valve flap configured to rotate between fully closed and fully opened positions.

12. The support system of claim 11, wherein the camera is positioned along a longitudinal axis of the valve channel so that the position of the butterfly valve flap can be directly observed.

* * * * *